(12) United States Patent
Martin et al.

(10) Patent No.: US 6,860,241 B2
(45) Date of Patent: Mar. 1, 2005

(54) FUEL FILTER INCLUDING SLOW RELEASE ADDITIVE

(75) Inventors: Harold Martin, Cookeville, TN (US); David M. Stehouwer, Columbus, IN (US); Joseph C. Drozd, Park Ridge, IL (US); Yu-Sen Chen, Naperville, IL (US)

(73) Assignees: Dober Chemical Corp., Midlothian, IL (US); Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/939,542

(22) Filed: Aug. 24, 2001

(65) Prior Publication Data

US 2002/0195380 A1 Dec. 26, 2002

Related U.S. Application Data

(60) Continuation-in-part of application No. 09/737,900, filed on Dec. 15, 2000, now abandoned, which is a division of application No. 09/333,556, filed on Jun. 16, 1999, now Pat. No. 6,238,554.

(51) Int. Cl.[7] .................................. F02B 51/00
(52) U.S. Cl. ..................... 123/1 A; 44/309; 44/389; 44/397; 210/698; 210/749; 428/407
(58) Field of Search .................... 44/309, 389, 397; 210/696–701, 749, 764, 206, 209, 192, 443, 444; 422/261, 263; 123/1 A; 428/407

(56) References Cited

U.S. PATENT DOCUMENTS

| | | |
|---|---|---|
| 2,280,792 A | 4/1942 | Bruson |
| 2,754,330 A | 7/1956 | Schreyer |
| 2,782,240 A | 2/1957 | Hefner et al. |
| 2,841,479 A | 7/1958 | Hefner et al. |
| 2,928,877 A | 3/1960 | Jaul et al. |
| 2,955,028 A | 10/1960 | Bevans |
| 3,087,436 A | 4/1963 | Dettlof et al. |
| 3,172,892 A | 3/1965 | Le Suer et al. |
| 3,215,707 A | 11/1965 | Rense |
| 3,231,587 A | 1/1966 | Rense |
| 3,235,084 A | 2/1966 | King et al. |
| 3,272,746 A | 9/1966 | Le Suer et al. |
| 3,275,554 A | 9/1966 | Wagenaar |
| 3,314,884 A | 4/1967 | Cover |
| 3,336,223 A | 8/1967 | Kneeland |
| 3,361,673 A | 1/1968 | Stuart et al. |
| 3,368,972 A | 2/1968 | Otto |
| 3,413,347 A | 11/1968 | Worrel |
| 3,422,157 A | 1/1969 | Kaufman et al. |
| 3,438,757 A | 4/1969 | Honnen et al. |
| 3,440,029 A | 4/1969 | Little et al. |
| 3,454,555 A | 7/1969 | van der Voort et al. |

(List continued on next page.)

FOREIGN PATENT DOCUMENTS

| | | |
|---|---|---|
| EP | 0279863 | 8/1988 |
| EP | 0376563 | 7/1990 |
| EP | 0448365 | 9/1991 |
| EP | 0476485 | 3/1992 |
| EP | 0516838 | 12/1992 |
| EP | 0573578 | 12/1993 |

*Primary Examiner*—Peter A. Hruskoci
(74) *Attorney, Agent, or Firm*—Stout, Uxa, Buyan & Mullins, LLP; Frank J. Uxa

(57) ABSTRACT

This invention relates to a fuel filter for use with internal combustion engines. The fuel filter includes a fuel additive that can be released into fuel. The rate of release for the fuel can be controlled. In one form the fuel additive can be mixed with a matrix material and released at a substantially constant rate to maintain a uniform level of fuel additive in the fuel. Use of the present invention provides a fuel filter having an extended life span that is longer than fuel filters typically used with combustion engines.

44 Claims, 6 Drawing Sheets

U.S. PATENT DOCUMENTS

| | | | |
|---|---|---|---|
| 3,454,607 A | 7/1969 | Le Suer et al. | |
| 3,565,804 A | 2/1971 | Honnen et al. | |
| 3,574,576 A | 4/1971 | Honnen et al. | |
| 3,598,738 A | 8/1971 | Biswell et al. | |
| 3,645,402 A | 2/1972 | Alexander et al. | |
| 3,649,229 A | 3/1972 | Otto | |
| 3,671,511 A | 6/1972 | Honnen et al. | |
| 3,697,574 A | 10/1972 | Piasek et al. | |
| 3,715,037 A | 2/1973 | Shin-En Hu | |
| 3,725,277 A | 4/1973 | Worrel | |
| 3,726,882 A | 4/1973 | Traise et al. | |
| 3,749,247 A | 7/1973 | Rohde | |
| 3,755,433 A | 8/1973 | Miller et al. | |
| 3,756,793 A | 9/1973 | Robinson | |
| 3,790,359 A | 2/1974 | Feldman | |
| 3,822,289 A | 7/1974 | Clark et al. | |
| 3,849,085 A | 11/1974 | Kreuz et al. | |
| 3,877,899 A | 4/1975 | Bundy et al. | |
| 3,880,569 A | 4/1975 | Bannister et al. | |
| 3,912,764 A | 10/1975 | Palmer, Jr. | |
| 3,932,537 A | 1/1976 | Wetzel et al. | |
| 3,954,808 A | 5/1976 | Elliott et al. | |
| 3,977,992 A | 8/1976 | Hofacker | |
| 3,980,589 A | 9/1976 | Murrell et al. | |
| 3,999,960 A | 12/1976 | Langer, Jr. et al. | |
| 4,026,809 A | 5/1977 | Lachowicz et al. | |
| 4,032,700 A | 6/1977 | Song et al. | |
| 4,066,559 A | 1/1978 | Rohde | |
| 4,075,097 A | 2/1978 | Paul | |
| 4,075,098 A | 2/1978 | Paul et al. | |
| 4,091,265 A | 5/1978 | Richards et al. | |
| 4,110,349 A | 8/1978 | Cohen | |
| 4,125,382 A | 11/1978 | O'Brien et al. | |
| 4,129,421 A | 12/1978 | Webb | |
| 4,137,185 A | 1/1979 | Gardiner et al. | |
| 4,156,061 A | 5/1979 | Pappas et al. | |
| 4,214,994 A | 7/1980 | Kitano et al. | |
| 4,222,746 A * | 9/1980 | Sweeney et al. | 44/309 |
| 4,231,759 A | 11/1980 | Udelhofen et al. | |
| 4,234,435 A | 11/1980 | Meinhardt et al. | |
| 4,238,628 A | 12/1980 | Cahill et al. | |
| 4,247,301 A | 1/1981 | Honnen | |
| 4,261,704 A | 4/1981 | Langdon | |
| 4,265,748 A | 5/1981 | Villani et al. | |
| 4,274,837 A | 6/1981 | Lilburn | |
| 4,294,586 A | 10/1981 | Cox, Jr. | |
| 4,320,019 A | 3/1982 | Hayashi | |
| 4,323,714 A | 4/1982 | Malloy et al. | |
| 4,326,972 A | 4/1982 | Chamberlin, III | |
| 4,357,250 A | 11/1982 | Hayashi | |
| 4,365,973 A | 12/1982 | Irish | |
| 4,379,065 A | 4/1983 | Lange | |
| 4,452,697 A | 6/1984 | Conrad | |
| 4,460,379 A | 7/1984 | Sweeney et al. | |
| 4,469,908 A | 9/1984 | Burress | |
| 4,515,740 A | 5/1985 | Schuettenberg et al. | |
| 4,561,981 A | 12/1985 | Characklis | |
| 4,639,255 A | 1/1987 | Schuettenberg et al. | |
| 4,658,078 A | 4/1987 | Slaugh et al. | |
| 4,663,063 A | 5/1987 | Davis | |
| 4,668,834 A | 5/1987 | Rim et al. | |
| 4,673,527 A | 6/1987 | Goudy, Jr. et al. | |
| 4,708,809 A | 11/1987 | Davis | |
| 4,717,495 A | 1/1988 | Hercamp et al. | |
| 4,728,452 A | 3/1988 | Hansen | |
| 4,740,321 A | 4/1988 | Davis et al. | |
| 4,755,189 A | 7/1988 | Feldman | |
| 4,756,844 A | 7/1988 | Walles et al. | |
| 4,782,891 A | 11/1988 | Cheadle et al. | |
| 4,849,569 A | 7/1989 | Smith, Jr. | |
| 4,857,073 A | 8/1989 | Vataru et al. | |
| 4,862,908 A * | 9/1989 | Payer | 137/13 |
| 4,892,562 A | 1/1990 | Bowers et al. | |
| 4,904,401 A | 2/1990 | Ripple et al. | |
| 4,933,077 A | 6/1990 | Wolf | |
| 4,937,299 A | 6/1990 | Ewen et al. | |
| 4,980,075 A | 12/1990 | Dobrez et al. | |
| 4,981,602 A | 1/1991 | Ripple et al. | |
| 5,009,848 A | 4/1991 | Secretarski et al. | |
| 5,019,669 A | 5/1991 | Adams et al. | |
| 5,024,268 A | 6/1991 | Cheadle et al. | |
| 5,032,259 A | 7/1991 | He et al. | |
| 5,050,549 A | 9/1991 | Sturmon | |
| 5,053,152 A | 10/1991 | Steckel | |
| 5,059,217 A | 10/1991 | Arroyo et al. | |
| 5,071,919 A | 12/1991 | DeGonia et al. | |
| 5,089,041 A | 2/1992 | Thompson et al. | |
| 5,094,666 A | 3/1992 | Feldman et al. | |
| 5,094,745 A | 3/1992 | Reynolds | |
| 5,120,349 A | 6/1992 | Stewart et al. | |
| 5,137,978 A | 8/1992 | Degonia et al. | |
| 5,137,988 A | 8/1992 | Matzner et al. | |
| 5,160,648 A | 11/1992 | Steckel | |
| 5,186,732 A | 2/1993 | Thompson et al. | |
| 5,192,335 A | 3/1993 | Cherpeck | |
| 5,209,842 A | 5/1993 | Moor | |
| 5,230,714 A | 7/1993 | Steckel | |
| 5,235,936 A | 8/1993 | Kracklauer | |
| 5,249,552 A | 10/1993 | Brooks | |
| 5,286,823 A | 2/1994 | Rath | |
| 5,296,154 A | 3/1994 | Steckel | |
| 5,300,701 A | 4/1994 | Cherpeck | |
| 5,324,800 A | 6/1994 | Welborn, Jr. et al. | |
| 5,332,407 A | 7/1994 | Herbstman | |
| 5,336,278 A | 8/1994 | Adams et al. | |
| 5,337,705 A | 8/1994 | Lane | |
| 5,346,965 A | 9/1994 | Dever et al. | |
| 5,368,615 A | 11/1994 | Steckel | |
| 5,372,942 A | 12/1994 | McGarrity et al. | |
| 5,395,518 A | 3/1995 | Gulsvig | |
| 5,407,594 A | 4/1995 | Fry et al. | |
| 5,408,018 A | 4/1995 | Rath | |
| 5,435,346 A | 7/1995 | Tregidgo et al. | |
| 5,456,217 A | 10/1995 | Thunker et al. | |
| 5,458,793 A | 10/1995 | Adams et al. | |
| 5,483,327 A * | 1/1996 | Taya et al. | 399/223 |
| 5,492,696 A | 2/1996 | Price et al. | |
| 5,496,383 A | 3/1996 | Franz et al. | |
| 5,507,942 A | 4/1996 | Davis | |
| 5,508,356 A | 4/1996 | Dever et al. | |
| 5,527,452 A | 6/1996 | Grigoriev et al. | |
| 5,565,106 A | 10/1996 | Sherbondy et al. | |
| 5,567,845 A | 10/1996 | Franz et al. | |
| 5,573,557 A | 11/1996 | Thünker et al. | |
| 5,580,359 A | 12/1996 | Wright | |
| 5,591,330 A | 1/1997 | Lefebvre | |
| 5,620,949 A | 4/1997 | Baker et al. | |
| 5,643,351 A | 7/1997 | Lew et al. | |
| 5,662,799 A | 9/1997 | Hudgens et al. | |
| 5,662,803 A | 9/1997 | Young | |
| 5,663,457 A | 9/1997 | Kolp | |
| 5,674,950 A | 10/1997 | Thaler | |
| 5,691,422 A | 11/1997 | Emert et al. | |
| 5,695,531 A | 12/1997 | Makino et al. | |
| 5,696,060 A | 12/1997 | Baker et al. | |
| 5,696,067 A | 12/1997 | Adams et al. | |
| 5,711,894 A | 1/1998 | Miyake et al. | |
| 5,718,836 A | 2/1998 | Nakatani et al. | |
| 5,739,356 A | 4/1998 | Dietz et al. | |
| 5,741,433 A | 4/1998 | Mitchell et al. | |
| 5,752,989 A | 5/1998 | Henly et al. | |

| | | | | | | |
|---|---|---|---|---|---|---|
| 5,752,991 A | 5/1998 | Plavac | | 5,919,869 A | 7/1999 | Thaler et al. |
| 5,756,435 A | 5/1998 | Carey et al. | | 5,948,248 A | 9/1999 | Brown |
| 5,772,873 A | 6/1998 | Hudgens et al. | | 6,010,639 A | 1/2000 | Mitchell et al. |
| 5,777,041 A | 7/1998 | Emert et al. | | 6,017,369 A | 1/2000 | Ahmed |
| 5,777,142 A | 7/1998 | Adams et al. | | 6,020,500 A | 2/2000 | Baker et al. |
| 5,780,554 A | 7/1998 | Emert et al. | | 6,074,445 A | 6/2000 | Ahmed |
| 5,786,490 A | 7/1998 | Dietz et al. | | 6,114,547 A | 9/2000 | Baker et al. |
| 5,803,024 A | 9/1998 | Brown | | 6,140,541 A | 10/2000 | Melder et al. |
| 5,833,722 A | 11/1998 | Davies et al. | | 6,183,524 B1 | 2/2001 | Ahmed |
| 5,840,920 A | 11/1998 | Baker | | 6,238,554 B1 | 5/2001 | Martin, Jr. |
| 5,856,524 A | 1/1999 | Dietz et al. | | RE37,369 E | 9/2001 | Hudgens et al. |
| 5,880,219 A | 3/1999 | Thaler et al. | | | | |
| 5,897,770 A | 4/1999 | Hatch et al. | | * cited by examiner | | |

FUEL FILTER INCLUDING SLOW RELEASE ADDITIVE

RELATED APPLICATIONS

This is a continuation-in-part of U.S. patent application Ser. No. 09/737,900 filed Dec. 15, 2000, now abandoned, which is a division of U.S. patent application Ser. No. 09/333,556, filed on Jun. 16, 1999, now U.S. Pat. No. 6,238,554 the disclosure of each of which application is incorporated in its entirety herein by reference.

BACKGROUND OF THE INVENTION

The present invention relates generally to a fuel filter for use with internal combustion engines, for example, but not limited to diesel engines in commercial vehicles. More specifically, the present invention is directed to a fuel filter containing a fuel additive that can be released into fuel and a method of releasing the additive into the fuel.

Fuel filters are necessary components used to protect combustion engines by filtering out contaminants and thereby preventing damage to the engine and other downstream components such as valves, fuel injectors, fuel lines and related components. Fuel can entrain a wide variety of contaminants from a number of sources. Frequently fuel oxidizes and forms resinous materials such as varnishes commonly referred to as asphaltenes. Bacteria can grow in fuel, particularly fuel that contains moisture. The growing bacteria forms a "slime" on inner surfaces of fuel tanks, fuel lines and fuel filters. The slime often sloughs off the surfaces and fuel transports the free slime through the fuel lines. The fuel filter filters out the asphaltenes and bacteria; however, in the process the asphaltenes and bacteria block the fuel filter element. The blocked filter exhibits a reduced fuel flow and increases the pressure differential across the filter element, thereby reducing engine performance and fuel efficiency. To maintain engine performance and reliability, the fuel filters must be replaced, often as frequently as every 2,000 to 4,000 vehicle miles. For many vehicles, particularly commercial trucks that travel thousands of miles a month, this significantly increases vehicle maintenance and operating costs and can reduce reliability.

Fortunately, the formation of asphaltenes and bacteria growth can be inhibited by adding fuel additives such as antioxidants and biocides to the fuel. Dispersants can be added to break up and dissolve some of the existing material clogging the filters and other fuel related components. To be effective, the additives must be constantly maintained in the fuel. This is often difficult. Unlike other fluid systems, such as the coolant and oil systems, the fuel system does not re-circulate all of the fluid. Therefore, the additives must be continuously added to the fuel at a controlled rate.

It is difficult to maintain a constant or desired level of an additive in the fuel. Typically an operator adds a bottled additive to the vehicle fuel tank with each fuel fill-up. While many bottled fuel additives are commercially available, often operators do not consistently add the additive with each fill-up. The additive might not be readily available or the operator may forget to include the additive. When the additive is added to the fuel tank, it does not always form a homogeneous mixture with the fuel. Fuel tanks do not include reliable methods for mixing fuel. Generally operators rely upon the turbulence created during a fill-up and by vehicle motion to mix the additive and fuel. Furthermore, the additive concentration in the fuel may vary, depending upon the amount of fuel added—assuming a set amount of additive is added with each fill-up.

The following references provide a background for filters in general that contain additives.

Davis in U.S. Pat. No. 5,372,942 describes a pressurized fuel filter having an additive embedded in wax; the wax/additive composition dissolves when contacted with fuel. Additional additive is only added when a portion of the fuel filter becomes clogged and the fuel level in the filter rises to contact and dissolve additional amounts of the wax/additive composition.

Lefebvre in U.S. Pat. No. 5,591,330 discloses an oil filter that includes a thermoplastic material having oil oxidation and acidification additives. The hot oil recirculating through the engine and the filter dissolves the thermoplastic material thereby releasing the additives into the oil.

Hudgens in U.S. Pat. No. 5,662,799 discloses a coolant filter for recirculating coolant. The coolant filter includes a supplemental coolant additive (SCA) and a release means to maintain the concentration of SCA already dissolved in the recirculating coolant fluid.

One of the design challenges addressed by the present invention is how to control the release of fuel additive into the fuel. The present invention solves this challenge in several ways, each of which is believed to be a novel and unobvious solution. The solution avoids the undesirable side effects, which have already been described and can be exploited to increase the maintenance interval, increase the fuel filter life span and enhance engine performance and fuel efficiency.

SUMMARY OF THE INVENTION

In one form, the present invention provides a fuel filter for filtering fuel and adapted to release a fuel additive into the fuel at a controlled rate. The fuel filter comprises a housing assembly including an inlet and an outlet for fuel and defining an interior chamber; a filter element disposed within the interior chamber; a source of fuel additive disposed within the interior chamber; and a slow release means for controlling the rate of release of the fuel additive into the fuel. The slow release means is positioned between the source of fuel additive and the fuel outlet.

In another form, the present invention provides a fuel filter for filtering fuel and adapted to release a fuel additive into the fuel. The fuel filter comprises an outer housing assembly defining a filter chamber, an inlet and an outlet for fuel; a filter element disposed within the filter chamber and positioned between the inlet and the outlet for fuel; an inner housing assembly positioned within the filter chamber, the inner housing assembly defining an inner chamber in fluid communication with the filter chamber; a source of a fuel additive disposed within the inner chamber; and a diffusion controlled orifice positioned between the source of fuel additive and the fuel outlet.

In another form the present invention provides a method of releasing a fuel additive into fuel. The method comprises: providing a fuel filter containing a fuel additive composition, the fuel filter positioned between a source of fuel and an internal combustion engine; contacting a portion of the fuel additive composition with a portion of the fuel to provide a fuel composition comprising fuel and fuel additive; and allowing the fuel composition to admix with the fuel.

In a further form, the present invention provides a method of releasing a fuel additive into fuel. This method comprises providing a fuel additive composition comprising a matrix material and an additive component located, for example, distributed, preferably substantially uniformly distributed, in the matrix material and effective, when released into the fuel, to provide at least one benefit to the fuel. The matrix material comprises at least one polymeric material and is (1) substantially insoluble in the fuel and/or (2) effective to reduce the rate of release of the additive component into the fuel relative to an identical composition without the matrix material. The fuel additive composition is contacted with the fuel, thereby releasing additive component from the fuel additive composition into the fuel.

One object of the present invention is to provide an improved fuel filter containing a fuel additive.

Another object of the present invention is to provide for effective, preferably sustained and more preferably controlled, release of fuel additive(s) into fuel.

Commonly assigned U.S. patent application Ser. Nos. 09/939,196 and 09/939,212, filed on an even date herewith, are directed to somewhat related subject matter. The disclosure of each of these co-pending U.S. applications is incorporated in its entirety herein by reference.

Each and every feature described herein, and each and every combination of two or more of such features, is included within the scope of the present invention provided that the features included in such a combination are not mutually inconsistent.

Further objects, features and advantages of the present invention shall become apparent from the detailed drawing and the descriptions provided herein.

DETAILED DESCRIPTION OF THE INVENTION

Figure 1:
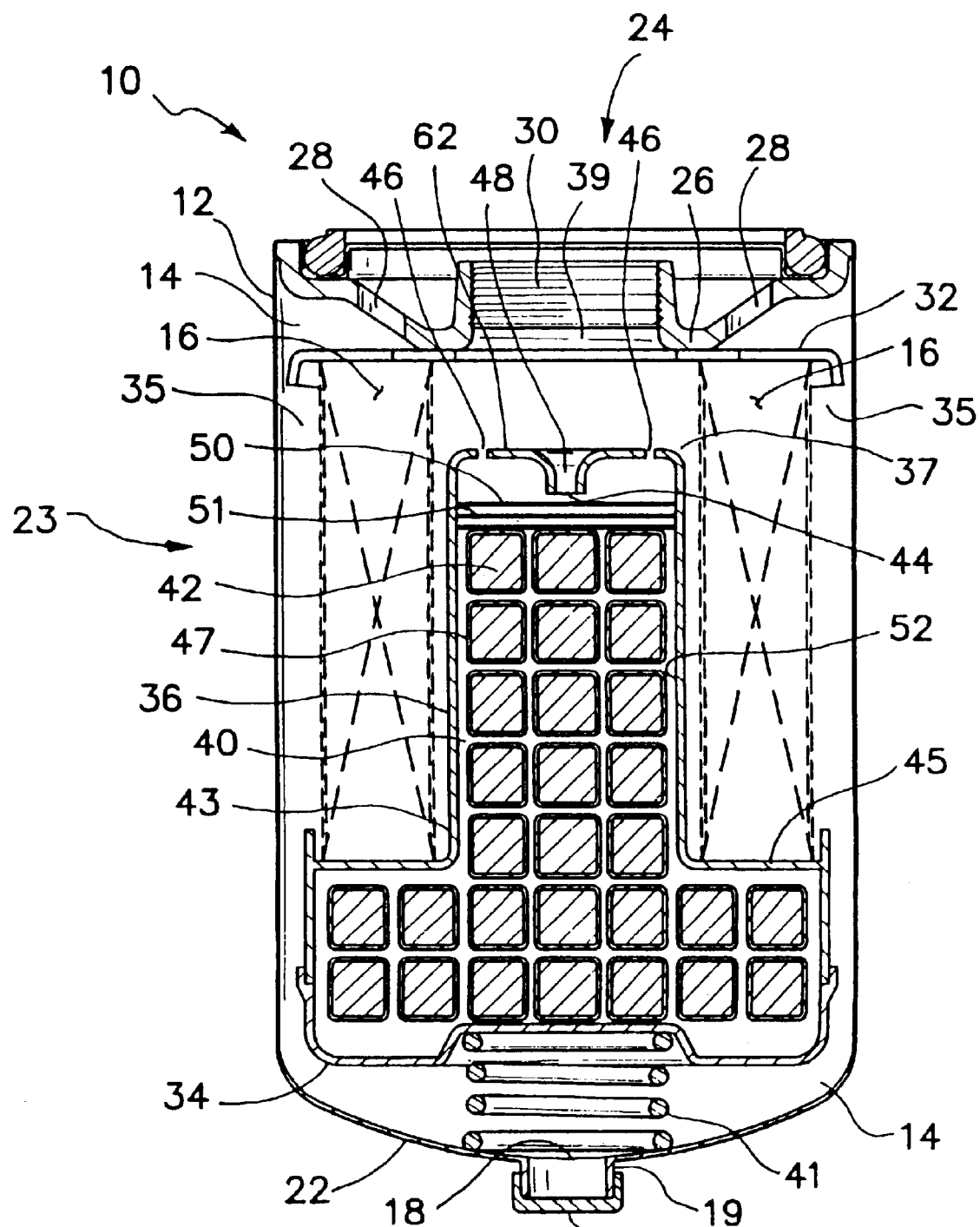
FIG. 1 is a front elevational view in full section of one form of a fuel filter according to the present invention.

For the purposes of promoting an understanding of the principles of the invention, reference will now be made to the embodiments illustrated in the drawings and specific language will be used to describe the same. It will, nevertheless, be understood that no limitation of the scope of the invention is thereby intended. Any alterations and further modifications in the described processes, systems, or devices and any further applications of the principles of the invention as described herein are contemplated as would normally occur to one skilled in the art to which the invention relates.

Unless otherwise expressly noted to the contrary, each of the words "include," "includes," "included" and "including" and abbreviation "e.g." as used herein in referring to one or more things or actions means that the reference is not limited to the one or more things or actions specifically referred to.

Referring to FIG. 1, there is illustrated a fuel filter 10 according to one embodiment of the present invention. The illustrated embodiment of filter 10 is intended to include basic components in a construction that is typical of such fuel filters with the exception of the fuel additive and the slow-release means associated with the fuel additive. The basic components of filter 10 include housing 12 defining a filter chamber 14, filter element 16 disposed within the filter chamber 14, drain opening 18 having an externally threaded wall 19, and cap 20 having internal threads adapted to matingly engage externally threaded wall 19.

Housing 12 includes a closed base end 22 and an open outlet end 24, which is crimped to the outer edge periphery of nut plate 26. The crimped combination creates a filter house assembly 23. Nut plate 26 provides the inlet openings 28 for fuel to enter filter 10. Internally threaded outlet aperture 30, which is defined by nut plate 26, provides the flow exit for the filtered fuel.

Filter element 16 is supported on one end by outlet end plate 32 and on an opposite end by base plate 34. Filter element 16 is bonded to end plate 32 to form a fluid tight seal. Fuel enters filter chamber 14 through inlet 28 and flows to annular space 35. From annular space 35, fuel flows radially inward through filter element 16 into an interior region 37, then out through opening 39 of outlet 30. From outlet 30, fuel flows to a combustion engine, which can include a carburetor system or fuel injection system (not shown).

Base end plate 34 provides a support and a seat for filter element 16, as well as for the components associated with the present invention, including the filter additive which is provided in the form of a plurality of tablets or pellets 42. In the embodiment illustrated by filter 10, base plate 34 is spaced from housing 12 by spring 41.

The foregoing description of the basic filter components and construction of fuel filter 10 is provided with regard to FIG. 1 and is applicable to the filter elements depicted in FIGS. 3–6. Accordingly, the same reference numerals will be used for the same components. The differences between filters illustrated in FIGS. 1 and 3–6 are embodied in the structures that house a plurality of coated pellet tablets 42.

Referring to FIG. 1, fuel filter 10 includes cap 36 and base plate 34, which matingly join together to form inner chamber 40. Cap 36 is substantially cylindrical and includes an upper portion 43 sized to have an outside diameter smaller than the inside diameter of filter chamber 14. Cap 36 includes an annular shelf 45 and an upper wall portion 62. Annular shelf 45 provides support for filter element 16 and is adapted to form a fluid tight seal with the lower portion of filter element 16. Upper wall portion 62 includes orifice 44, which provides fluid communication between inner chamber 40 and inner region 37. The upper wall portion can also include at least one, preferably two, vent openings 46. Upper wall 62 includes an axially protruding tapered diffusion tube 48. Diffusion tube 48 defines a tapered diffusion passageway for orifice 44, which extends therethrough and establishes a passageway of fluid communication between the inner chamber 40 and inner region 37.

Figure 2:
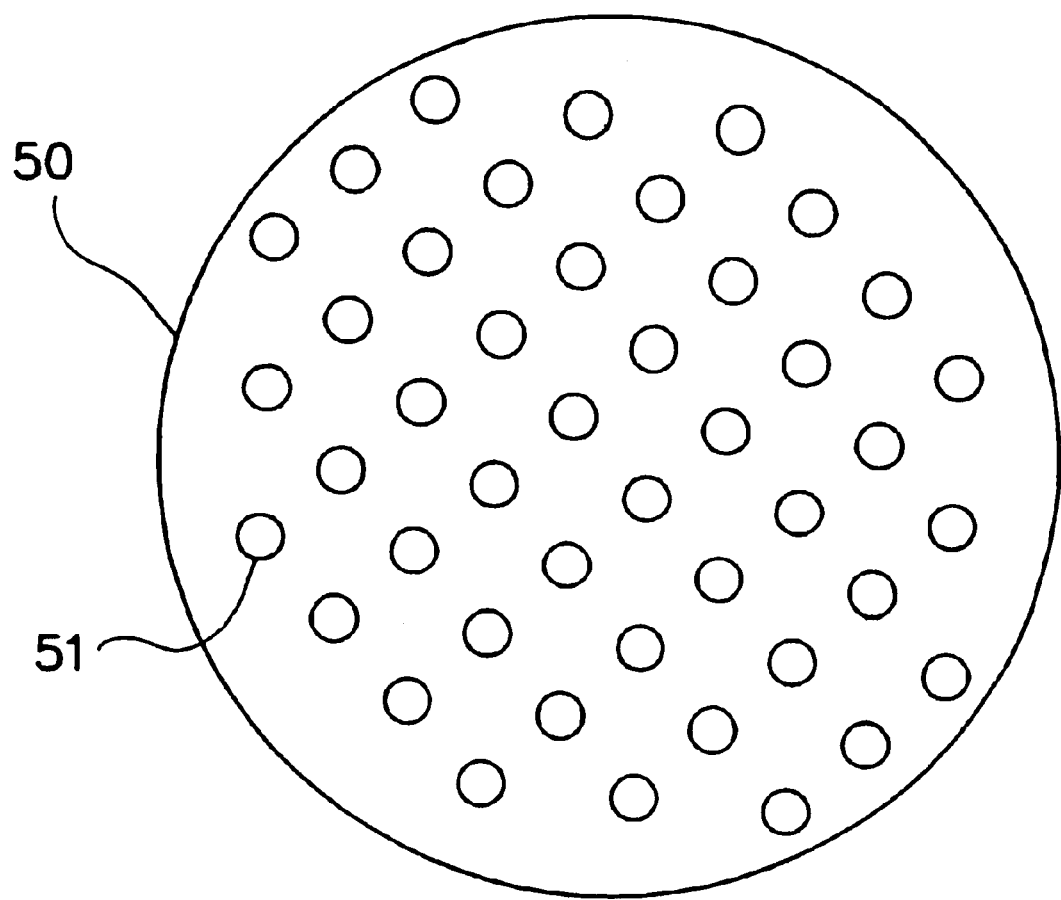
FIG. 2 is a top plan view of a baffle plate for use with the fuel filter of FIG. 1.

Referring additionally to FIG. 2, there is illustrated a typical baffle plate 50 for use with the present invention. Cap 36 can include, but is not required to include, at least one, preferably a plurality, of baffle plates 50. Each baffle plate 50 includes a plurality of openings 51 formed therethrough. Baffle plate 50 is spaced from diffusion tube 48. In preferred embodiments, cap 36 includes three baffle plates 50 spaced from each other, each baffle plate individually bonded about its peripheral edge to inner surface 52 of cap 36. It will be appreciated that in alternative forms cap 36, which includes at least one baffle plate 50, need not include a diffusion control orifice or the diffusion tube 48. When thus provided, cap 36 has an opening providing fluid communication with filter chamber 12 and includes a sufficient number of baffle plates 50 to slow the flow of fuel into inner chamber 40 and/or to control the rate of release of the fuel additive. Further, a plurality of baffle plates 50 can be provided to reduce turbulence in inner chamber 40. Preferably, each baffle plate 50 is spaced from an adjacent baffle plate to misalign the plurality of openings 51 in the adjacent baffle plates.

As is illustrated in FIG. 1, cap 36 seats on base plate 34 and forms an inner housing 43 assembly that defines inner chamber 40. The only openings into inner chamber 40 are the diffusion orifice 44 and vent openings 46. Inner chamber 40 is substantially filled with a fuel additive composition, which is illustrated in a form of a tablet 42. It is understood that the fuel additive composition can be provided in a variety of shapes and sizes, including cubic, cylindrical, and spherical. Typically, tablets 42 are provided in a cubic shape to fill the inner chamber 40.

Fuel from filter chamber 14 in filter 10 migrates through the diffusion orifice 44 into an inner chamber 40. Fuel in inner chamber 40 contacts the outer coating 47 of fuel additive tablet 42. Fuel then diffuses through the coating 47 to contact the fuel additive composition, which dissolves in the fuel to provide a fuel composition comprising the dissolved additive. The fuel composition diffuses back through coating 47 into inner chamber 40. The fuel composition mixes with fuel in inner chamber 40.

The fuel system is unlike the coolant and oil systems used with internal combustion engines because the fuel system does not recirculate all of the fluid. Therefore, under these conditions, a significant amount of fuel entering into filter chamber 14 has not been recirculated through filter 10 and for all practical purposes includes very little dissolved additive. While not intending to be bound by any theory, it is believed that the concentration of dissolved additive in the fuel composition in inner chamber 40 is vastly greater than the concentration of dissolved additive in the fuel in filter chamber 14 outside inner chamber 40. This concentration difference is significantly greater than would be expected in a recirculating fluid system. This concentration difference creates a stronger driving force for the fuel composition to migrate from inner chamber 40 into filter chamber 40. In preferred embodiments, baffle plate 50 and/or diffusion orifice 44 are provided to inhibit or reduce the flow of fuel into and out from inner chamber 40. This increases the useful lifespan of fuel filter 10 and controls the rate of release of the fuel additive composition into the fuel.

Inner chamber 40 provides a substantially quiescent region inside filter chamber 14 that does not experience the currents created by fuel flowing through filter 10. As the concentration of dissolved fuel additive in inner chamber 40 increases relative to concentration of the fuel additive in filter chamber 12, the fuel composition migrates or diffuses from inner chamber 40 into filter chamber 14 in an effort to achieve equilibrium. The fuel composition comprising the dissolved additive and the fuel diffuses through diffusion tube 48 and diffusion orifice 44 that defines a restricted opening for the migration of the higher concentration solution out of the inner chamber 40 and mixes with fuel in filter chamber 14.

The fuel additives for use in this invention can be of liquid or solid form. Two or more fuel additives can be combined. The fuel additive can further include a wide variety of binders, compounding agents and mold release agents. As used herein, the term fuel additive includes any commercially known and/or commonly used fuel additive that imparts beneficial properties to the fuel and/or the engine and related fuel-handling components. Common classes of fuel additives include: antioxidants, antiwear agents, cetane improvers, corrosion inhibitors, demulsifiers, detergents, dispersants, flow improvers, lubricity agents, and metal deactivators.

In one particularly advantageous embodiment of the invention, the fuel additive(s) are combined with a suitable polymer to form a fuel additive composition having a fuel additive component and a sustained release component. For example, the fuel additive composition may be in the form of a solid or semisolid material such as the coated tablets 42 shown in FIG. 1. Alternatively or additionally, the fuel additive composition comprises a fuel additive component mixed with a matrix material, wherein the matrix material is selected to control the rate of release of the additive into the fuel.

Tablets 42 of fuel additive include an outer hydrocarbon insoluble coating 47, which encases the fuel additive composition tablet 42. The hydrocarbon insoluble coating is selected to be substantially insoluble in hydrocarbon fuel mixtures, yet be permeable to the fuel to allow the fuel to penetrate the coating and contact the fuel additive. A portion of the fuel additive dissolves in the fuel to provide a fuel composition that includes the dissolved fuel additive. The coating may be a hard coating or a soft pliable coating. In general, any coating material can be used with this invention, provided the coating allows fuel access to the fuel additive composition and does not harm downstream fuel systems, fuel injectors, valves and related engine components.

The coating material provides a sustained release component of the fuel additive composition tablets 42 in that it is effective to reduce the rate of release of the fuel additive into the fuel relative to a similar additive without the coating material. Typical and preferred coating materials are commercially available polymers, copolymers and block copolymers including, but not limited to: polyethylene or polyvinyl acetate and mixtures thereof. Preferably the coating is selected to provide an effective rate of release of the additive into the fuel. By effective rate of release, it will be understood that the additive is released at a concentration sufficient to provide beneficial properties to the fuel and related fuel-handling components.

An alternative design of FIG. 1 includes replacing the plurality of coated tablets 42 with a fewer number of much larger pellets or tablets. By reducing the total surface area of the fuel additive for a specific mass of fuel additive composition, the additive composition dissolves at a slower rate. For example, the fuel additive composition may be present in the filter 10 in the form of a single object. (See briefly, for example, FIG. 6.) The fuel additive composition may comprise forms of various shapes as well, for example, cylindrical tablets and cubic tablets, spherical tablets and "donut" shaped pucks. Preferably the fuel additive compositions are cylindrical. The different shapes and sizes can control the sustained release rate.

In one embodiment, the additive composition is in the form of a cylindrical tablet having dimensions of about 9 mm length and about 9 mm diameter. The tablet may also be cubical with all sides being about 9 mm. In another embodiment, the additive composition is a flat puck with a hole in the center, outside diameter of about 8 cm, inside diameter of about 5 cm and height of about 3 cm.

Alternatively or additionally to providing the fuel additive composition tablet as described herein, it is particularly advantageous to embed a liquid fuel additive in a matrix, for example, a solid matrix. This provides another means of controlling the rate the additive is released into the fuel. More specifically, for example, the fuel additive can be embedded within or surrounded by a matrix which is either hydrocarbon soluble or hydrocarbon insoluble. Notably, however, if the matrix material is hydrocarbon insoluble, the fuel must be able to contact the fuel additive, for example, by penetrating the matrix.

It is noted that a "matrix material" as used herein refers to a sustained release component that is mixed with the fuel additive or fuel additive component to form the fuel additive composition. This is distinguished from a sustained release component which is coated around the fuel additive component itself, such as described hereinabove regarding coated tablets 42.

Preferably, the matrix material comprises a polymeric material, including any suitable polymer or mixture of polymers selected to achieve a desired release rate, hardness, solubility and melting range. The polymeric material can be a solid, a gel, a paste, a molten material or the like when initially mixed with the fuel additive. Preferably, the sustained release material, i.e. either or both of the matrix material and the coating material, has a melting point of at least about 82° C.

The polymeric material, for example, may include, without limitation, polymer repeating units derived from an olefin component having 2 to about 12 atoms per molecule. Useful polyolefins including, without limitation, polymers of unsubstituted, aliphatic hydrocarbon olefins of 2 to about 12 carbon atoms, for example, polymers of an unsubstituted, aliphatic hydrocarbon olefin of 2 to about 12 carbon atoms and a substituted, aliphatic hydrocarbon olefin of 2 to about 12 carbon atoms. In one preferred embodiment, the polymeric material is oxidized. In another preferred embodiment, the polymeric material is amidized.

In one embodiment, the matrix material includes an aliphatic acid component, for example, as aliphatic acid component which includes alphatic acid molecules having about 18 or about 28 to about 36 carbon atoms. A particularly useful aliphatic acid component is montanic acid, nominally $C_{28}H_{56}O_2$. Suitable aliphatic acid components, for example, montanic acids, preferably have melting points from about 76° C. to about 87° C., more preferably about 76° C. to about 81° C. In one useful embodiment, the aliphatic acid component has a melting point of at least about 80° C. or at least about 82° C.

In a preferred embodiment, the aliphatic acid component, for example, montanic acid, may also be esterified to form an acid ester wax, e.g., a montanic acid ester wax. The aliphatic acid ester wax preferably has a predominant ingredient of esters of about $C_{20}$ to about $C_{30}$ fatty acids, including montanic acid.

In another embodiment, the montanic acid may link with other aliphatic carboxylic acids to form carboxylic acid amides. For example, one or more montanic acids may be linked to at least one aliphatic carboxylic acid having at least about 10 carbon atoms, preferably from about 14 to about 25 carbon atoms, with at least difunctional polyamines, polyols, or alkanolamines having molecular weights from about 60 to about 400, preferably from about 60 to about 200.

Other polymeric materials are also capable of forming the matrix component. These polymeric materials include, without limitation, cellulose, ethylcellulose, other cellulose derivations, silicones, rubbers, fatty and synthetic surfactants, thermoplastic resins, adsorbants and the like, combinations thereof and mixtures thereof.

Preferred polyolefins are prepared from unsubstituted, aliphatic hydrocarbon monoolefins, including, without limitation, straight chain and branched chain compounds such as ethylene, propylene and butene-1, isobutene, pentene, hexene, heptene, octene, isobutene, 3-methylbutene-1,4-methylpentene-1,4-methylhexene-1, and 5-methylhexene-1 and the like.

The polyolefin may contain an unsubstituted, aliphatic hydrocarbon polyene, such as a diene or triene, as a monomer unit. Such unsubstituted compounds can be straight chain, branched chain or cyclic compounds. Polyenes of from about 4 to about 12 carbon atoms per molecule may be employed.

Suitable comonomers for preparing the polyolefins are those utilized to prepare homopolymers as listed above such as propene or butene-1 with ethylene or isobutylene with isoprene and the like. Suitable termonomers are those utilized to prepare homopolymers and copolymers as disclosed above such as propene, ethylene and the like containing up to about 15 percent, preferably up to about 10 percent by weight of polyene, for example, a diene such as dicyclopentadiene, 1,3-butadiene, 1,5-cyclooctadiene, 2-ethylidenenorbornene-5,1,4-hexadiene, 1,4-heptadiene, bicyclo(2,2,1)hepta-2,5-diene and other conjugated and especially noncojugated dienes with linear or cyclic chains.

Trienes such as isopropylidene cyclopentadiene and the Diels-Alder mono- and di-adducts thereof with cyclopentadiene can be used in place of the diene.

Unsubstituted aliphatic diolefins can also be used for preparing useful polyolefins such as butadiene, isoprene, octadiene, and the like. Especially useful are the various forms of polybutadiene, such as made in emulsion, suspension or solution processes, and random, block, and star block polymers with monomers such as styrene.

In another embodiment, the polymeric material further includes different polymer repeating units derived from an ethylenically unsaturated monomer. In one embodiment, this polymeric material is polyethylene. The polymeric material may be an oxidized polyethylene wax, for example, such as is sold under the trademark Licowax PED 522 from Clariant and/or an amidized polyethylene wax.

In another embodiment, the polymeric material is a copolymer of ethylene and vinyl acetate, for example, a polyethylene/vinyl acetate copolymer. Polyethylene/vinyl acetate copolymers provide highly fuel resistant protective membranes and are able to withstand high fuel and/or engine temperatures. In one embodiment, the polymeric material is a copolymer of ethylene and butylene.

In yet another embodiment, the polymeric material is selected from polypropylene, polypropylene oxide, and mixtures thereof, for example, such materials having a molecular weight of about 500,000. Examples of useful polypropylene oxides include a material sold by Clariant under the trademark Coathylene PY 0787F. Other useful polymeric materials include ethylene-propylene copolymers ranging in molecular weight from about 200,000 to about 300,000, ethylene-ethylacrylate polymers ranging in molecular weight from about 200,000 to about 300,000 and the like, and combinations thereof and mixtures thereof. One polymer that has been found to be advantageous is polyisobutylene ranging in molecular weight from about 60,000 to about 135,000. An example of a useful polyisobutylene is that sold under the trademark VISTANEX that is manufactured by the Enjay Chemical Company.

Repeating units derived from an ethylenically unsaturated monomer used to form the polymeric material include: Monoolefinic hydrocarbons, i.e. monomers containing only carbon and hydrogen, including such materials as ethylene, propylene, 3-methylbutene-1,4-methylpentene-1, pentene-1, 3,3-dimethylbutene-1,4,4-dimethylbutene-1, octene-1, decene-1, styrene and its nuclear, alpha-alkyl or aryl substituted derivatives, e.g., o-, m- or p-methyl, ethyl, propyl or butyl styrene, alpha-methyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl, butyl, octyl and lauryl methacrylate; alkyl crotonates, e.g., octyl; alkyl acrylates, e.g., methyl, ethyl, propyl, butyl, 2-ethylhexyl, stearyl, hydroxyethyl and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl compounds, e.g., allyl chloride, allyl alcohol, allyl cyanide, allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alphabromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1,3-octenonitrile, crotononitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl-2-ethylhexyl ether, vinyl 2-chloroethyl ether, vinyl cetyl ether and the like; and vinyl sulfides, e.g., vinyl beta-chloroethyl sulfide, vinyl beta-ethoxyethyl sulfide and the like can also be included as can diolefinically unsaturated hydrocarbons containing two olefinic groups in conjugated relation and the halogen derivatives thereof, e.g., butadiene-1,3; 2-methylbutadiene-1,3,2,3-dimethylbutadiene-1,3; 2-methylbutadiene-1,3; 2,3-dimethylbutadiene-1,3; 2-chlorobutadiene-1,3; 2,3-dichloro-butadiene-1,3; and 2-bromo-butadiene-1,3 and the like. Mixtures of the foregoing compounds can also be employed.

Particularly useful monomer compositions also include styrene, methyl methacrylate, methyl acrylate, vinyl acetate, mixtures of styrene and acrylonitrile, and mixtures of styrene and various maleates.

In one particularly advantageous embodiment of the invention, the matrix material comprises a mixture of polymers selected to achieve the desired release rates, hardness, solubility and melting range. Such mixtures may include, for example, polyethylene/polypropylene, preferably ethylene/butylene, which has better durability. The matrix material may further serve as a structural agent to the composition. In one embodiment, the matrix material is a gel. In a preferred embodiment, the matrix material is initially a solid, for example, a wax, in the fuel additive composition.

In one embodiment, the fuel additive composition is layered. For example, the innermost core of the additive composition may be a mixture of an additive component and a first matrix material. The next layer of the additive composition may be a mixture of an additive component and a matrix material different from the first. Alternatively, the next layer may be a mixture of the additive component and the matrix material of the first layer, but having a different mixture ratio. The additive composition of the present invention may include more than one layer. In one embodiment, the additive composition comprises more than two layers. In another embodiment, the additive composition comprises more than three layers. Such layered additive composition provides for a variable release profile, for example fast and then slow.

Other arrangement schemes may serve to vary the release pattern of the additive component. For example, an additive composition of the present invention may comprise a liquid additive component, for a example a dispersant, which is covered with a solid layer of an additive component/matrix material mixture to control the release pattern.

In one embodiment, a fuel additive composition comprising an additive component and a matrix material may further include a release enhancer component to increase the release rate. A release enhancer component may be a wicking material. Such wicking material may include, without limitation, cotton and polyester fibers. The release enhancer component may be one or more surfactants including nonionic surfactants such as polyoxyethylene-polyoxypropylene block copolymers and the like.

In one embodiment, an additive composition comprising an additive component and a matrix material may further include a reinforcement component, to reinforce the structure of the additive composition, making it less susceptible to erosion by flowing fuel. Such a component may include, without limitation, fibers. In a preferred embodiment, cotton, polyester and/or fiberglass fibers are added to the matrix, preferably molten matrix, of the additive composition.

In a preferred embodiment, the matrix material is polypropylene, preferably polypropylene wax, sold under the trademark Licowax PP 230. Polypropylene wax is preferable due to its insolubility at high temperatures. Also, polypropylene is preferable because it has a high softening point, i.e. 329° C. It is believed that higher softening point allows the polymeric material to remain intact as a unit to maintain a steady rate of release.

As described elsewhere herein, an additive composition useful in the present invention may include an outer coating material which encases the selected additive component. In one embodiment of the invention, the additive composition comprises a mixture of additive component/matrix material forming a coated-additive composition in which the matrix material has the same or a different composition than the coating material. More specifically, in one embodiment of the invention, at least portions of the mixture comprising an additive component and a matrix material are surrounded by a coating material. In other words, the fuel additive composition may comprise, for example, a fuel additive component mixed with a matrix material and formed into tablets or other forms supported by a solid or semisolid coating material. Both the matrix material and the coating material provide for sustained release of the additive component when the tablets are contacted with fuel, and may be selected to control a rate of release of the additive component. In the matrix-additive-coated additive composition, it should be appreciated that the matrix component may comprise a substantially fluid or liquid material.

The rate at which additives are to be released may be adjusted by the thickness of the coating. In a preferred embodiment, the coatings constitute about 5% to about 50% of the total fuel additive composition weight. In a more preferred embodiment, the coatings constitute about 8% to about 25% of the total additive composition weight.

The rate of release of the additives may also be adjusted by the amount of matrix material in the fuel additive composition. For example, more matrix material content in the fuel additive composition reduces the rate of additive release. In one embodiment, the matrix materials constitute about 10% to about 90% of the total additive composition weight. In a preferred embodiment, the matrix materials constitute about 25% to about 70%, and more preferably 50%, of the total additive composition rate.

The coating material may be selected from any of the sustained release components as disclosed above. In one embodiment, the coating material includes a molten material (a molten sustained release component), an emulsion polymer and/or solvent material. In a preferred embodiment, the coating material is polyethylene vinyl acetate, sold as under the trademark Airflex 410 by Air Products.

Outer coatings may be hard or soft and while each style has its own mechanism for exposing the encased additives to the fuel, either style is suitable for use with the present invention. For example, polyvinylidene chloride (PVDC) is used as a coating material. PVDC is a hard coating which releases additives when fuel soaks through the coating. The fuel causes the additives inside of the coating to swell and eventually this causes the coated pellet to crack open. This then exposes the additives inside to the fuel. An example of a soft coating material is polyvinyl acetate (PVA). While fuel also penetrates the soft coating, it does not crack open because it is pliable. Instead the fuel diffuses through the coating, dissolves some of the additives and then escapes back out of the coated composition. Both the PVDC and PVA coating materials are insoluble in fuel at the engine operating temperature.

Table 1 shows other polypropylene wax compounds and mixtures that are good matrix materials because they are insoluble at high temperatures and have high softening points.

In one embodiment, the matrix material is oxidized polyethylene wax. However, as seen from Table 1, this matrix material melts at high temperatures, for example 121° C. Although it may melt at high temperatures, it is still useful as a matrix material if the additive composition is coated, for example with Airflex 410. Table 1 shows that when an additive, distributed in matrix material is coated with 18% polyethylene vinyl acetate, it is insoluble at 121° C.

TABLE 1

Hot Fuel Resistance of Tablets made with 50% Dispersant in Various Matrices

| | | | Solubility in Fuel | |
|---|---|---|---|---|
| Matrix Name | Composition | Softening point, °F. | ½ hr at 121° F. | 24 hrs at 104° F. |
| Licowax PED 522 | Polyethylene wax, oxidized | 221 | Dissolved | Insoluble |
| Licowax PED 522 w/18% PE/VA coating | Polyethylene wax, oxidized | 221 | Insoluble | Insoluble |
| Licowax PED 552 with 10% PE/VA[1] coating | Polyethylene wax, oxidized | 221 | Insoluble | Insoluble |
| Licowax PED 153 | Polyethylene wax, oxidized | 248 | Dissolved | Dissolved |
| Licowax PE 190 | Polyethylene wax | 275 | 50% dissolved | 50% dissolved |
| Licowax PP 230 | Polypropylene wax | 320 | Insoluble | Insoluble |
| Licowax C PM | | | 50% dissolved | 50% dissolved |
| Licolube FA-1 | Amide wax | | 50% dissolved | 50% dissolved |
| Coathylene PY 0787F | Polypropylene | 329 | Insoluble | Insoluble |
| Licomont TP AR 504 | Polypropylene wax maleated | 311 | Insoluble | Insoluble |
| Uniwax 1750 | Stearamide | 275 | Dissolved | |
| Elvax 260 | PE/28% VA | 309 | Softened | |
| Elvax 350 | PE/VA | | Softened | |
| Elvax 450 | PE/18% VA | 302 | Softened | |
| Elvax 750 | PE/9% VA | 307 | Softened | |
| Elvax 770 | PE/9.5% VA | 441 | Softened | Softened |
| Licowax 230 (40%) and AR 504 (10%) | Polypropylene and polypropylene oxidized | | 25% dissolved | 25% dissolved |
| Licowax 230 (25%) and Elvax 750 (25%) | Polypropylene and PE/VA | | 25% dissolved | 25% dissolved |
| Hot glue stick | | | Dissolved | Dissolved |
| Epoxy resin | | | Dissolved | Dissolved |
| Permatex RT silicone | | | Dissolved | Dissolved |

[1]Polyethylene vinylacetate

In a preferred embodiment, the additive composition comprises a dispersant. A preferred dispersant is an amine acylated with a hydrocarbyl-carboxy acylating agent. U.S. Pat. Nos. 5,053,152; 5,160,648; 5,230,714; 5,296,154; and 5,368,615, the content of each of which is incorporated in its entirety herein by reference, describe dispersants of this type prepared using amine condensates.

A particularly useful dispersant is manufactured and sold by the Lubrizol Corporation under the tradename 0276.6.

In a more preferred embodiment, the additive composition comprises about 50% to about 75%, preferably about 66% by weight, of dispersant; about 10% to about 25%, preferably about 17% by weight, of polypropylene wax; and about 10% to about 25%, preferably about 17% by weight, of polypropylene.

In addition to 0276.6 dispersant, other dispersants are useful in the present invention. For example, Henly et al U.S. Pat. No. 5,752,989, the disclosure of which is incorporated in its entirety herein by reference, discloses a dispersant comprising at least one member of the group consisting of polyalkylene succinimides and polyalkylene amines.

In another embodiment, the fuel additive compositions comprise a microbiocide compatible with combustion systems and fuels, which is more soluble in fuel than water. In another embodiment, a flow enhancer is added to the fuel. For example, fatty amides derived from succinic acid and phthalic acid are used as wax crystal growth inhibitors, as disclosed by Davis et al U.S. Pat. No. 5,833,722, the disclosure of which is incorporated in its entirety herein by reference. Also, a branched hydrocarbon mixture of about 1000 MW with copolymer of ethylene and unsaturated ether are used, as described by Feldman U.S. Pat. No. 3,790,359, the disclosure of which is incorporated in its entirety herein by reference. Alkyldiphenyl ether, as disclosed by Langer et al U.S. Pat. No. 3,999,960, the disclosure of which is incorporated in its entirety herein by reference, can also be used in this invention as a flow enhancer, for example, fuel wax crystal inhibitor.

Suitable antioxidants that can be added to fuel are metal dithiophosphates and metal dithiocarbonates. One particular antioxidant additive that has been found to be highly satisfactory and is preferred is a phenolic antioxidant, 4,4'-methylene-bis(2,6-di-tertbutylphenol), which is commercially available under the tradename ETHYL 702 (Ethyl Corporation).

Anti-wear agents, such as sulfur, metal naphthenates, phosphate esters and sulfurized hydrocarbons, etc., may also be used. One highly satisfactory and preferred EP additive, which is highly satisfactory as a bearing corrosion inhibitor is zinc dibutyldithio-carbamate, which is commercially available as BUTYL ZIMATE (R. T. Vanderbuilt Company).

Flow improvers, such as are disclosed by Feldman et al U.S. Pat. No. 5,094,666, the disclosure of which is incorporated in its entirety herein by reference, can be used. For example, such anti-gel and cold flow additives comprise copolymers of ethylene and vinyl esters of fatty acids with molecular weight of 500–50,000; or Tallow amine salt of phthalic anhydride, used at 0.005–0.2%; or Tallow amine salt of dithio-benzoic acid, used at 0.005–0.15%; or 4-hydroxy,3,5-di-t-butyl dithiobenzoic acid; or ethylene-vinyl acetate copolymers.

Dispersants/detergents, such as that disclosed by Herbstman U.S. Pat. No. 5,332,407, the disclosure of which is incorporated in its entirety herein by reference, can also be used, for example, 4-alkyl-2-morpholine and alkylphenyl polyoxyalkylene amine.

Lubricating agents may also be used, for example, carboxylic acid polyol esters, dimer acid, polyol esters, castor oil, vegetable oils, fatty methyl esters (especially rapeseed), glycol esters, particularly oleates and linoleates (unsaturated). Lubricating agents, such as that disclosed by Carey et al U.S. Pat. No. 5,756,435, the disclosure of which is incorporated in its entirety herein by reference, can be used. Examples of lubricating agents include glycerol monooleate, or fatty formates, or fatty amides or 1,2-alkane diols. These additives may be in an amount from about 0.02 to about 0.2% of fuel.

Stabilizers, such as disclosed by Sweeney et al U.S. Pat. No. 4,460,379, the disclosure of which is incorporated in its entirety herein by reference, may be used. For example, such additive includes a hydrocarbyl polyoxypropylene di (polyoxyethylene) amine.

Emission (e.g., CO and nitrogen oxides) reducing agents, such as disclosed by Bowers et al U.S. Pat. No. 4,892,562, the disclosure of which is incorporated in its entirety herein by reference, may be used. For example, 0.01–1.0 ppm of fuel-soluble organometallic platinum compound in an oxygenated solvent such as octyl nitrate can be used as an emission reduction additive. Another example of emission additive includes dibenzyl cyclooctadiene platinum II in octyl nitrate. Cox U.S. Pat. No. 4,294,586 also discloses an emission reduction additive for use in diesel fuel. The disclosure of Cox is incorporated in its entirety herein by reference. Such additive includes a mixture of alcohol, toluene, and hydrogen peroxide. Additionally, Vararu et al U.S. Pat. No. 4,857,073 discloses a composition comprising an admixture form about 6% of di-tertiary butyl peroxide, about 1% of tall oil imidazoline, about 0.5% of neo-decanoic acid and the balance being a hydrocarbon solvent carrier thoroughly mixed with the peroxide, imidazoline and acid. The disclosure of Vararu is incorporated in its entirety herein by reference.

Demulsifiers, such as that disclosed by O'Brien et al U.S. Pat. No. 4,125,382, the disclosure of which is incorporated in its entirety by reference herein, may be used, for example, polyoxyethylene ethers.

Insoluble coating materials are known and are used to coat additives, such as coolant additives. For example, Hudgens et al in U.S. Pat. No. 5,662,799 disclosed a coolant filter which includes coolant additives encased in an insoluble coating, polyvinyl acetate, the content of which is incorporated in its entirety herein by reference.

Although coating additives with an insoluble coating material for use in a coolant system is known, it is surprising that a similar coating is applicable in the fuel system because the coolant and fuel system are very different. For example, the coolant system is a closed loop. The fuel system is semi-recirculating, with significant recycling. Therefore, the fuel system requires the coating material to be such that it can release sufficient additive for instant combination with the fuel as the fuel passes (once) through the filter medium. Furthermore, the additives may need to be released at a rate proportional to the flow of fuel, which is not a necessary requirement in the coolant system. Also, the temperature in the cooling system is often lower than that of a fuel system. Furthermore, the two systems are chemically different. For example, the coolant comprises essentially water/ethylene or propylene glycol, which is an aqueous media. Fuel often comprises hydrocarbons and is essentially free of water. Such fuels may be generally characterized as those that comprise a major proportion, that is at least about 50% by weight, of hydrocarbons boiling in the range of from about 140° C. to about 400° C.

The additive compositions above may be present in the housing in the form of a single object. In another embodiment, the composition is present as a plurality of particles. These compositions may be of various sizes. Regardless of the size, it is understood that the additive composition can be provided in a variety of shapes, such as cylindrical tablets and cubic tablets, spherical tablets and "donut" shaped puck. The additive compositions may be cubic. The shape and size of the additive composition can be used in controlling the sustained release rate of the additive.

In one preferable embodiment, the additive composition is in the form of a tablet. The tablet may be a cylinder of about 9 mm length×about 9 mm diameter. The tablet may also be cubical with all sides being about 9 mm. In another embodiment, the additive composition is a flat puck-like structure with a hole in the center, outside diameter of about 8 cm, inside diameter of about 5 cm and height of about 3 cm.

In one broad embodiment of the invention, the methods of forming the compositions are as follows. Substantially solid units of fuel additives, for example fuel dispersants, Lubrizol 129093A, are submerged into or sprayed with a coating material, for example polyethylene vinylacetate copolymer. The coating material envelops and dries over the fuel additive unit. The material, including the coating material, employed in this process may initially be a molten coating material or the coating material in a solvent material.

To form the additive-matrix composition, the additive, for example a fuel dispersant, Lubrizol 129093A, is mixed with the molten matrix material, for example, oxidized polyethylene wax. Other matrix materials, as described elsewhere herein, may also be used. In one embodiment, the matrix material may be a single-component or multiple component cured polymer. For example, a monomer with catalyst or a two part polymer, such as an epoxy or urethane, can be mixed with the additive and allowed to polymerize or cure into a solid. A coating, as described elsewhere herein, may be applied to the additive-matrix composition to form a coated-additive-matrix composition.

Figure 3:
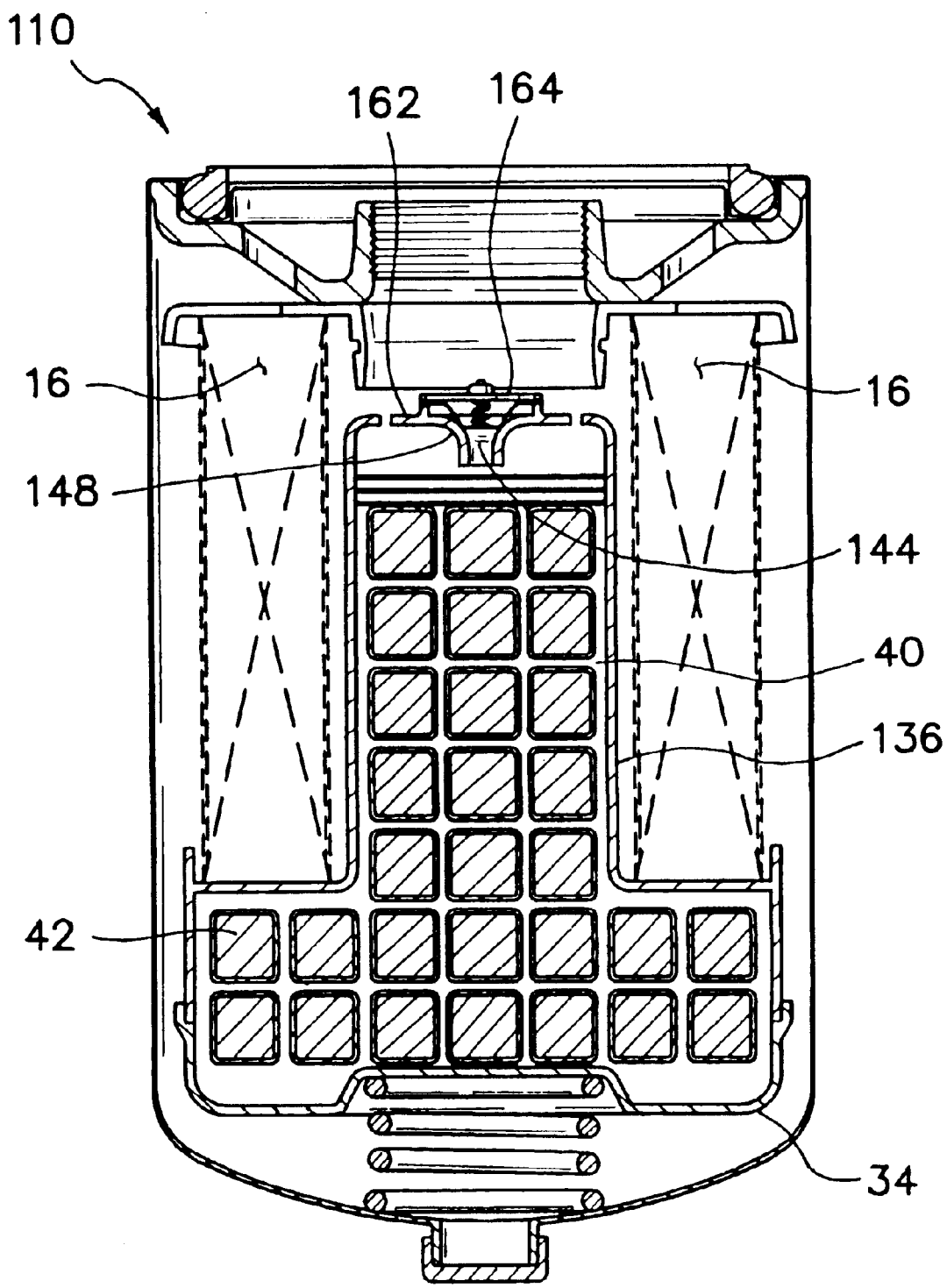
FIG. 3 is a front elevational view in full section of an alternative embodiment of a fuel filter comprising a thermostat according to the present invention.

Referring now to FIG. 3, an alternative embodiment of the present invention is illustrated. As has been previously mentioned, the basic filter components of filter 110 are the same as those of filter 10, and accordingly, the same reference numbers have been used for the basic components. Alternative and additional components are referenced with a one hundred prefix designation. Located within filter 110 is cap 136 and base plate 34. Cap 136 includes opening 144 formed therethrough. Opening 144 can be provided in the form of a diffusion orifice that is defined by a diffusion tube 148. Thermostat 164 is provided in opening 144. Thermostat 164 is adapted to control the flow of fuel into inner chamber 40 and can be selected from a wide variety of commercially available thermostats. For example, a wax type thermostat can be adapted for use in the present invention. In preferred operation, the thermostat opens in response to a temperature level of fuel in filter 110. When opened, the thermostat allows passage of fuel into inner chamber 40. The thermostat 164 can be adapted to open in response to either fuel that is sufficiently warm or fuel that is sufficiently cool.

In one preferred embodiment, thermostat 164 opens in response to fuel that is sufficiently warm. Fuel additives providing additional benefits to warm fuel can be released on an as-needed release basis. For example, antioxidants and dispersants can be added to the warm fuel to inhibit the deposition of resinous material on filter element 16. Dispersions can be provided to suspend or dissolve the resinous material, which are eventually burned in an engine (not shown). In alternative embodiments, the thermostat 164 opens when fuel in filter 110 is sufficiently cool. Cool fuel can be indicative of a recently filled tank or of fuel that has not been recirculated through the fuel filter. In either case, the cool fuel may require additional additives to enhance engine performance and/or fuel efficiency. Under certain conditions fuel is circulated through the fuel injection where it becomes heated. The heated fuel can be recirculated through the fuel filter. Since the fuel has already been through the fuel filter, no additional additive may be needed. Thus, when the fuel is sufficiently warm, thermostat 164 can close and prevent the addition of the fuel additive to the heated fuel.

As an additional benefit, the fuel additive composition can include an anti-gelling agent for diesel fuel. Thermostat 164 can operate to open in response to cool or cold fuel. The anti-gelling additives can be released on a need-release basis into the fuel to enhance engine performance in cold weather.

Fuel filter 110 can also include, but is not required to include, one or more baffle plates 150. Similar to the design of fuel filter 10, baffle plates 150 are positioned in inner chamber 40 adjacent to opening 144 in upper wall 162.

Figure 4:
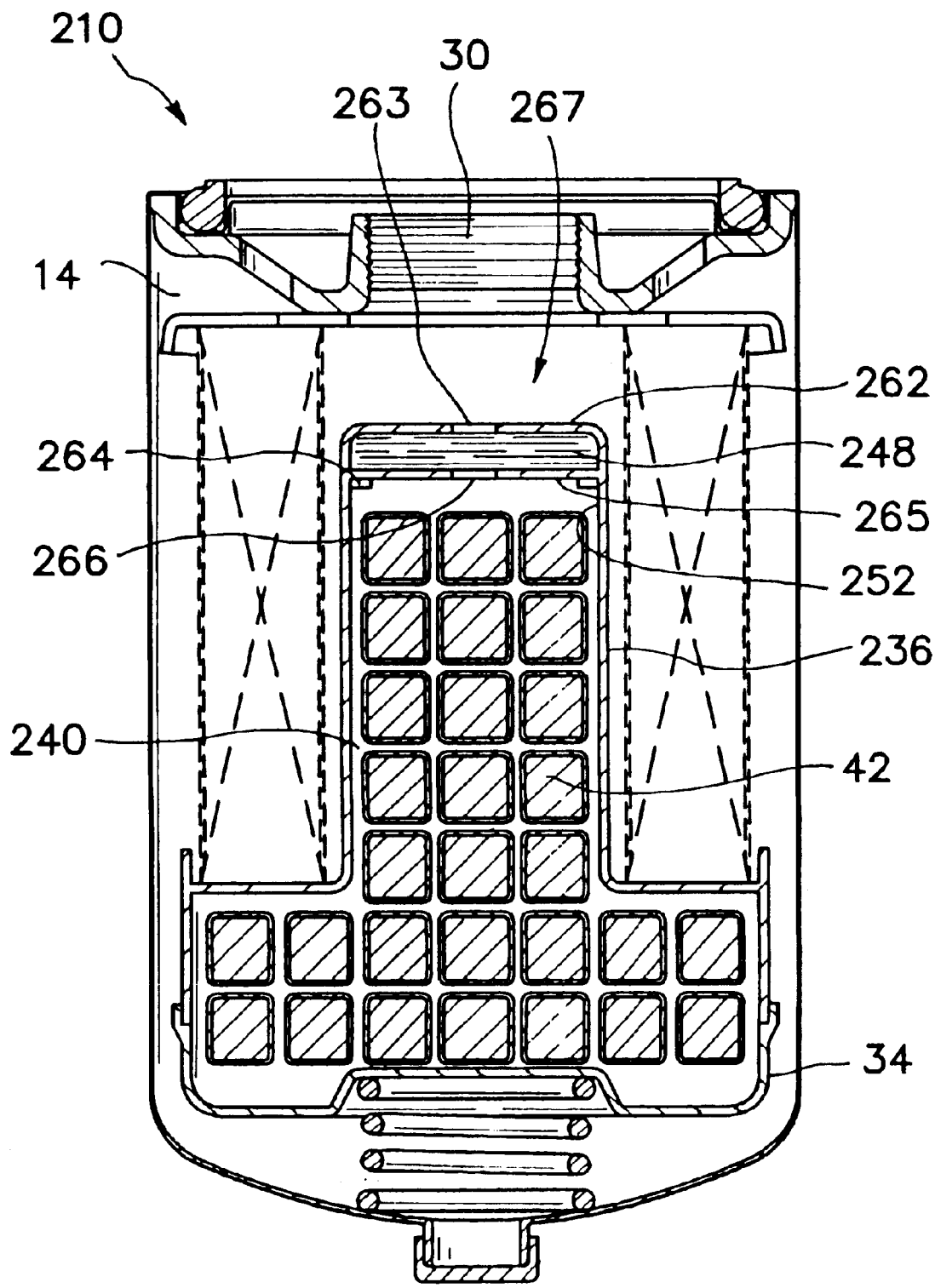
FIG. 4 is a front elevational view in full section of an alternative embodiment of a fuel filter comprising a semi-permeable membrane according to the present invention.

Referring now to FIG. 4, another embodiment of the present invention is illustrated. The basic filter components of filter 210 are the same as those of filter 10, and accordingly, the same reference numbers have been used for the basic components. Alternative and additional components are referenced with a two hundred prefix designation. Located within filter 210 is a cap 236 and base plate 34. Cap 236 includes a double wall structure 267 that includes a semi-permeable membrane wafer sandwiched therebetween.

Cap 236 includes inner surface 252. Inner surface 252 includes a unitary upper wall 262, which defines centrally therein an orifice 263. The inner surface 252 includes molded thereon a small annular lip 264 which serves as a retainer for circular plate 265. Plate 265 functions as a second wall in cooperation with upper wall 262 to hold in position therebetween a substantially cylindrical diffusion or osmotic wafer 248. The preferred material for diffusion wafer 248 is a microporous polymer, co-polymer or block copolymer including, but not limited to: polyethylene glycol or polyvinyl acetate and mixtures thereof. Plate 265 defines centrally therein an opening 266, which is aligned with opening orifice 263. This combination permits the gradual migration of fuel into inner chamber 240 to contact tablets 42. Osmotic wafer 248 is positioned between the fuel additive and the outlet aperture 30 through which the filtered fuel containing the fuel additive flows on toward the engine (not shown). Use of the semi-permeable membrane in the form of membrane 248 permits only a gradual migration of a portion of fuel in filter chamber 14 into inner chamber 240. This provides a slow release of the fuel additive composition into the fuel to maintain a substantially constant level of fuel additive in the fuel system.

Figure 5:
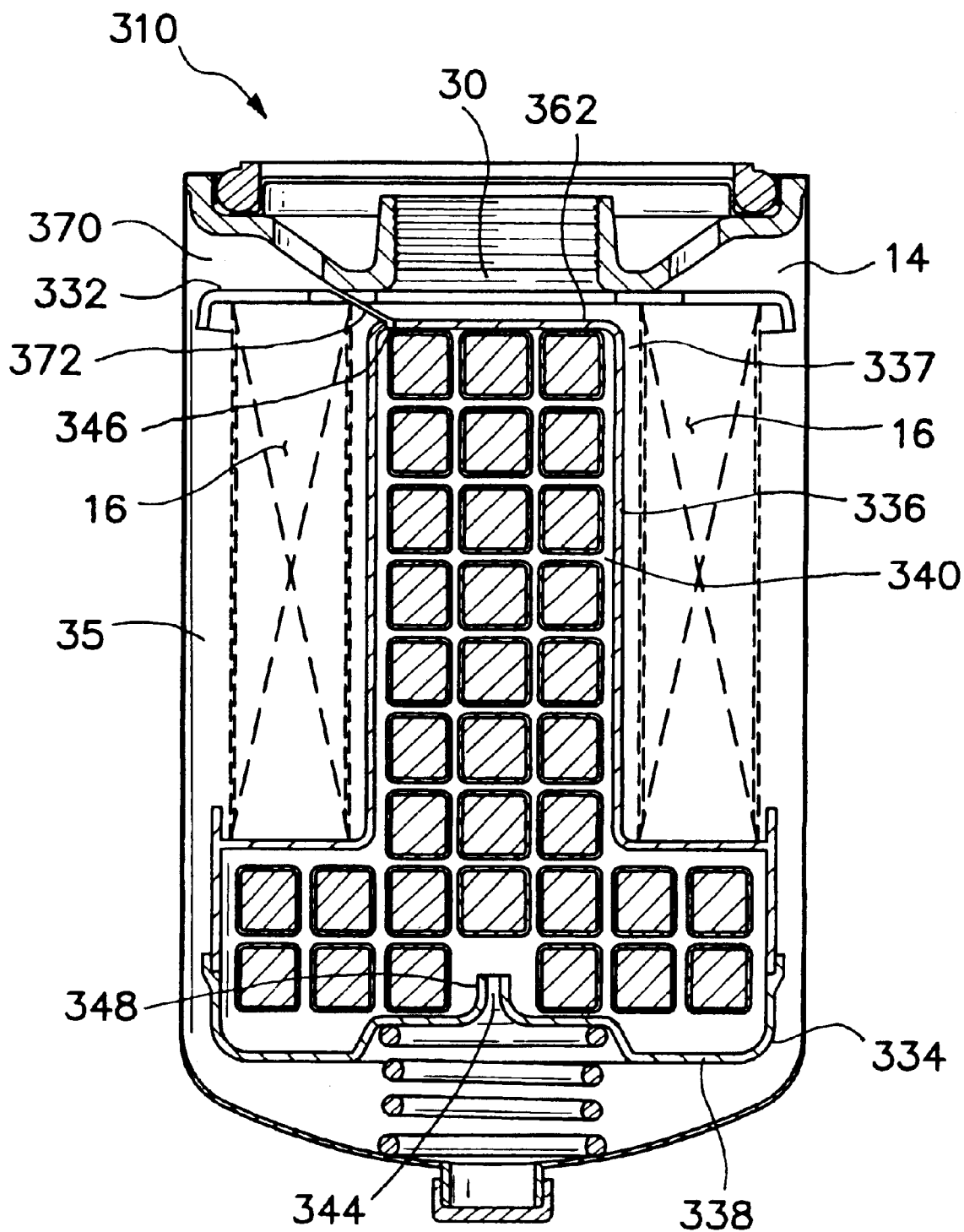
FIG. 5 is a front elevational view in full section of another embodiment of a fuel filter according to the present invention.

In FIG. 5 there is illustrated yet another embodiment of the present invention. The basic filter components of filter 310 are the same as those of filter 10, and accordingly, the same reference numbers have been used for the basic components. Alternative and additional components are referenced with a three hundred prefix designation. Filter 310 includes base plate 334 having a lower wall portion 338. Lower wall portion 338 includes orifice 344 formed therethrough which provides fluid communication between inner chamber 340 and filter chamber 314. Lower wall 338 also can include an axially protruding tapered diffusion tube 348. Diffusion tube 348 defines a tapered diffusion passageway for orifice 344 that extends therethrough and establishes a passageway of fluid communication between the inner chamber 340 and filter chamber 314.

Preferably upper wall 362 of cap 336 includes at least one air vent opening 346. In one alternative form, outlet endplate 332 can include a substantially circular, hollow vent tube 372 extending obliquely therefrom and adapted to extend from outlet endplate 332 through air vent opening 346 to provide fluid communication between region 370 that is proximate to inlet 328 and inner chamber 340. In an alternative form, the outlet end plates do not include vent tube 372, and air vent opening 346 can vent into the interior region 337 of filter chamber 14. In operation after all the air in inner chamber 340 has escaped through air vent opening 346, a portion of the fuel mixture in inner chamber 340 could flow out air vent opening 346 into interior region 337 and out outlet 30, preferably at a substantially lower flow rate than fuel flows from annular space 35 through filter element 16 and out outlet 30.

Figure 6:
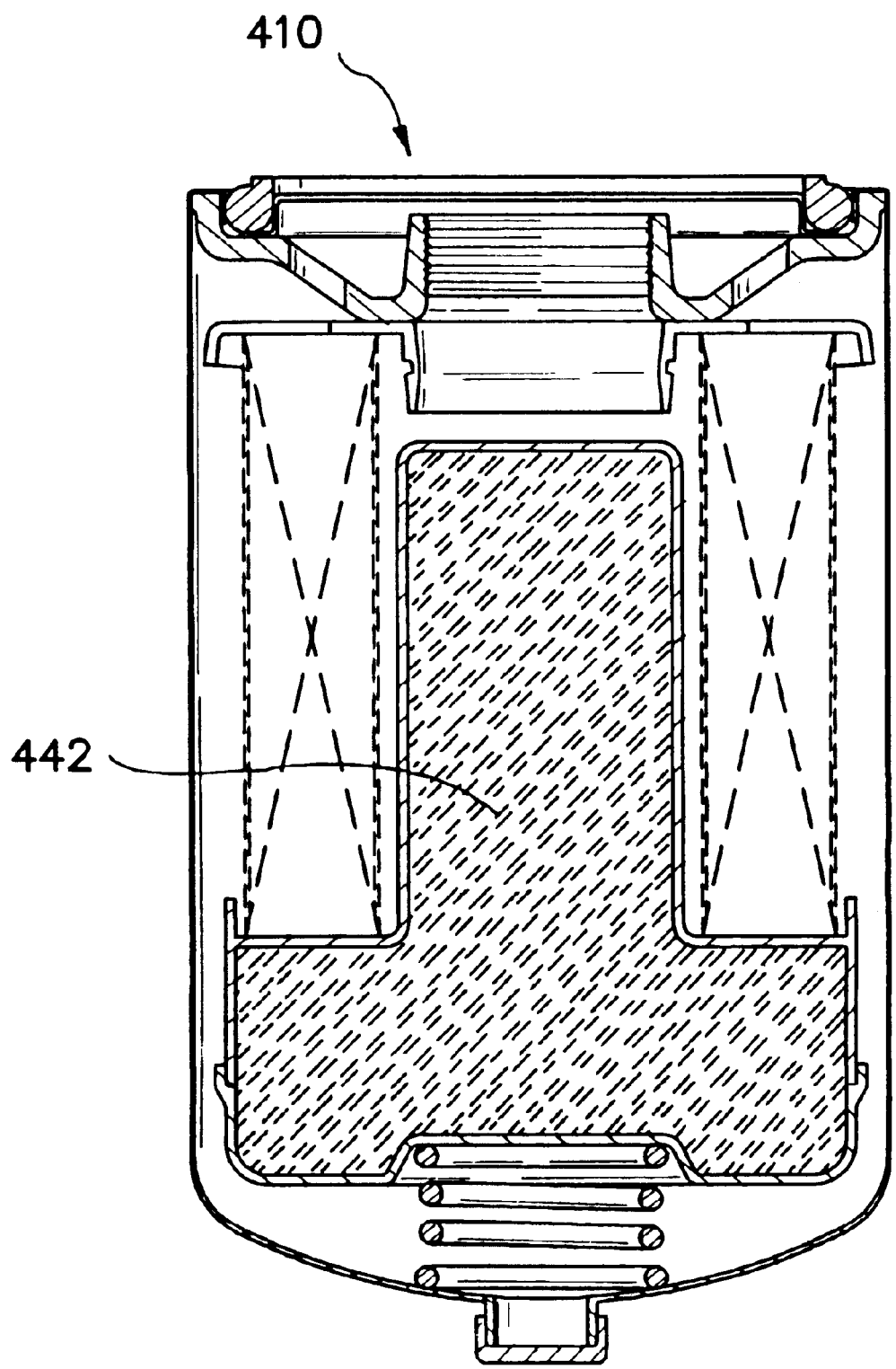
FIG. 6 is a front elevational view in full section of yet another embodiment of a fuel filter comprising a fuel additive briquette according to the present invention.

In FIG. 6 there is illustrated an alternative embodiment of a fuel filter 410 for use with the present invention. Fuel filter 410 includes a fuel additive in a single large tablet or cartridge 442. While it is possible to include fuel additive cartridge 442 in either of FIG. 1 or FIGS. 3–5, the use of smaller coated tablets is preferred. By the use of smaller tablets, a larger mass of the fuel additive can be loaded into the inner chamber without any particular regard to the size or shape of the chamber.

The following examples illustrate certain aspects of the present invention and are not intended to limit the scope of the invention.

EXAMPLE 1

500 g of Lubrizol OS#69593 dispersant/detergent and 500 g of a commercially available polyethylene wax are provided. The polyethylene wax is heated to a temperature above its melting point, for example, about 140° C. The dispersant/detergent is slowly combined with the molten polyethylene wax with constant stirring until all the dispersant/detergent is included and a substantially uniform mixture is formed. The mixture is then cooled and formed into tablets, using conventional techniques and equipment. The tablets include the dispersant/detergent distributed substantially uniformly in a polyethylene wax matrix.

EXAMPLE 2

600 g (50% by weight Lubrizol OS#69593 in 50% by weight polyethylene (PE wax) in the form of tablets is coated with 191 g of commercially available polyethylene/vinyl acetate copolymer latex over a period of 21 minutes to form coated tablets. Pan speed is 20 rpm, airflow 38 to 52 ft$^3$/min, air inlet temperature ranges from about 42° C. to about 57° C. (about 45° being preferred) and exhaust temperature ranges from about 27° C. to about 32° C. The tablets tumble well and there is virtually no "twinning." Tablets with a dry coating weight of 12.7% are obtained. The tablets have a dull finish and uniform orange peel appearance under the microscope. After standing, blocking of the tablets is apparent.

EXAMPLE 3

800 g of the uncoated tablets having a composition as set forth in Example 2 are placed in the coating unit. A total of 365 g of commercially available polyethylene/vinyl acetate copolymer latex is sprayed and about 25 g of coated tablets are removed approximately every 10 minutes to obtain tablets with increasing coating weights. Total run time is 39 minutes. Pan speed is 20 rpm, airflow is 38 to 42 ft$^3$/min, air inlet temperature ranges from 43° C. to 56° C. and exhaust temperature ranges from 27° C. to 30° C. Tablets with 3.2, 9.7, 15.6 and 18.3% coating (dry weight) are obtained with every 10 minute intervals. The tablets have a dull finish and uniform orange peel appearance under the microscope. After standing, blocking of the tablets is apparent.

EXAMPLE 4

Additives distributed in a soluble matrix may cause the additive composition to become soluble. However, when such composition is coated with polyethylene/vinyl acetate, the additive composition becomes insoluble, even at high temperatures.

For example, at about room temperature, 28° C., both coated and non-coated tablets comprising 50% dispersant/detergent and 50% polyethylene wax are insoluble in fuel. At 82° C., non-coated tablets are completely dissolved. However, tablets coated with 18% polyethylene/vinyl acetate are protected from solubilizing in fuel at 82° C.

EXAMPLE 5

The rate of additive release is dependent on the concentration of the additive in the additive composition. The rate is also dependent on the thickness of the coating material.

If an uncoated table is made up of 64% by weight dispersant/detergent and 36% polyethylene wax, the release rate is about 240 mg/L/hr. With lower dispersant concentrations, the rate can be lowered. For example, at 50% or 35% dispersant/detergent, the rate of release is about 50 mg/L/hr. Therefore, reducing additive concentration in a matrix/additive composition reduces the release rates.

Coating the matrix/additive composition also reduces release rates. For example, a 64% dispersant/detergent tablet coated with 5% of polyethylene/vinyl acetate has a release rate of 32 mg/L/hr.

The release rate of 50% dispersant/detergent tablets in a Fleetguard FS 1000 fuel filter is tested. 300 tablets weighing about 190 g total are placed into the filter. Each tablet comprises 50% by weight dispersant/detergent and 50% by weight polyethylene wax. The tablets are not coated. The testing provides for a fuel flow rate through the filter of 5.7 L/min and a total fuel volume of 10 gal (37.85 L). 50 ml of fuel is sampled daily for three weeks. The fuel circulates through the filter continually.

The maximum dispersant/detergent concentration that could be reached is 5,000 mg/L in 600 hours. The test results show that 2,200 mg/L of dispersant/detergent is reached in 300 hours. Extrapolated to 600 hours, the concentration would be 4,400 mg/L, which is about 4 ppm for the number of tablets used. This release rate approximates that needed for constant release over 30,000 miles (600 hours at 50 mph). Moreover, because of fuel by-pass, dispersant/detergent concentration would be higher in a true system. This simulation provides evidence that matrix/additive tablets are an effective approach to providing useful additive concentrations over practical periods of time/mileage.

While the foregoing description provided several embodiments for controlling the release of a fuel additive composition into fuel, it will be understood that the inner housing assembly can be formed to include a variety of structures and openings to allow migration of fuel into the inner chamber. In preferred embodiments, the inner chamber provides a quiescent region inside filter chamber where a source of a fuel additive surrounded by a portion of the fuel flowing through the fuel filter is protected from the typical fluid forces acting on the fuel in the filter.

The present invention provides a method of enhancing the operation of an internal combustion engine. In one form, the enhancement is provided by controlling the release of a fuel additive into fuel. The controlled release of the additive maintains a constant, uniform concentration of additive in the fuel. In preferred embodiments, the additive is released in a controlled manner to maintain a substantially uniform concentration of additive in the fuel despite the varying amount of fuel that is recirculated through the fuel filter. Use of the present invention decreases the maintenance time and costs, enhances engine performance and increases fuel efficiency. In another form, the invention enhances the usable and/or effective lifespan of fuel filters by providing fuel additives that effectively inhibit the formation of resinous material such as varnishes and asphaltenes and help breakup or disperse such material that has been deposited on fuel handling components.

According to the present invention, a diffusion tube, diffusion orifice, and baffles may be used to slow the release of the fuel additive into the fuel. The matrix material mixed with the fuel additive and/or the coating on the fuel additive also limits the rate of additive that is dissolved in the fuel. In an alternative embodiment of the present invention, a semi-permeable membrane wafer is sandwiched between an upper wall and a retaining plate to provide a slow release means for the mechanism due to the composition of the wafer. This mechanical arrangement may be used with a plurality of smaller tablets or larger tablets or some other form of fuel additives. Further, a thermostat can be included with the openings for each embodiment to provide a need-release feature for the present invention. The thermostat opens in response to fuel that exhibits a temperature level within a predetermined temperature range and permits migration of fuel into the inner chamber.

While the invention has been illustrated and described in detail in the drawings and foregoing description and examples, the same is considered to be illustrative and not restrictive in character. It is understood that only the preferred embodiments have been shown and described and that all changes and modifications that come within the spirit of the invention are desired to be protected.

What is claimed is:

1. A method of releasing a fuel additive into a fuel, said method comprising the steps of:
   providing a fuel filter containing a fuel additive combined with a matrix material in a fuel additive composition, said fuel additive being distributed in said matrix material and being effective when released into a fuel to provide at least one benefit to said fuel, said fuel filter positioned between a source of fuel and an internal combustion engine;
   contacting a portion of said fuel additive composition with a portion of said fuel to provide a fuel composition comprising said fuel additive dissolved in said portion of said fuel, 50% or less of said matrix material is dissolved in said fuel during said contacting; and
   allowing said fuel composition to admix with said fuel.

2. The method of claim 1 wherein said fuel additive composition is coated with a hydrocarbon insoluble coating.

3. The method of claim 1 wherein said allowing includes positioning a diffusion control orifice between said fuel composition and said fuel.

4. The method of claim 1 wherein said allowing includes positioning at least one baffle plate between said fuel composition and said fuel.

5. The method of claim 1 wherein said allowing includes allowing said fuel composition to diffuse into said fuel when said fuel exhibits a temperature level within a predetermined temperature range.

6. The method of claim 1 wherein the matrix material comprises a polymeric material.

7. The method of claim 1 wherein the fuel additive composition further comprises a coating material surrounding at least a portion of the additive component and the matrix material.

8. The method of claim 7 wherein the coating material is present in an amount effective to reduce the rate of release of the additive component into the fuel relative to an identical fuel additive composition without the coating material.

9. The method of claim 7 wherein the coating material is substantially fuel insoluble.

10. The method of claim 1 wherein 50% or less of said matrix material is dissolved in said fuel after said contacting.

11. The method of claim 1 wherein the matrix material is effective to reduce the rate of release of the fuel additive into the fuel relative to an identical composition without the matrix material.

12. The method of claim 1 wherein said fuel is a hydrocarbon-containing liquid.

13. A method of releasing a fuel additive into fuel, said method comprising the steps of:
    providing a fuel additive composition comprising:
      a matrix material and an additive component, the additive component being located in the matrix material and effective, when released into a fuel, to provide at least one benefit to the fuel, end the matrix material being (1) substantially insoluble in the fuel and (2) effective to reduce the rate of release of the additive component into the fuel relative to an identical composition without the matrix material; and
    contacting the fuel additive composition and fuel at conditions effective to release additive component from the fuel additive composition into the fuel, the matrix material remaining substantially insoluble in the fuel during the contacting.

14. The method of claim 13 wherein the matrix material comprises at least one polymeric material.

15. The method of claim 14 wherein the polymeric material includes polymer repeating units derived from an olefin component having 2 to about 12 carbon atoms per molecule.

16. The method of claim 14 wherein the polymeric material comprises a polymer of ethylene.

17. The method of claim 14 wherein the polymeric material comprises a copolymer of ethylene and vinyl acetate.

18. The method of claim 14 wherein the polymeric material comprises a copolymer of ethylene and butylene.

19. The method of claim 14 wherein the polymeric material is at least partially oxidized.

20. The method of claim 14 wherein the polymeric material is an oxidized polyethylene wax.

21. The method of claim 14 wherein the polymeric material is an oxidized polypropylene wax.

22. The method of claim 13 wherein the fuel is a liquid.

23. The method of claim 13 wherein the fuel is a diesel fuel.

24. The method of claim 13 wherein the matrix material is initially in a form selected from the group consisting of a gel or a paste in the fuel additive composition.

25. The method of claim 13 wherein the matrix material has a melting point of at least about 82° C.

26. The method of claim 13 wherein the matrix material comprises more than one polymeric material.

27. The method of claim 13 wherein the matrix material includes an aliphatic acid component.

28. The method of claim 27 wherein the aliphatic acid component includes aliphatic acid molecules having about 28 to about 36 carbon atoms.

29. The method of claim 27 wherein the aliphatic acid component includes a montanic acid.

30. The method of claim 27 wherein the aliphatic acid component has a melting point of at least about 80° C.

31. The method of claim 13 wherein the fuel additive composition has more than one layer, each layer comprises a different mixture of the additive component and the matrix material.

32. The method of claim 13 wherein the fuel additive composition further comprises a coating material surrounding at least a portion of the additive component and the matrix material, the coating material being present in an amount effective to reduce the rate of release of the additive component into the fuel relative to an identical additive composition without the coating material.

33. The method of claim 32 wherein the matrix material has a different composition than the coating material.

34. The method of claim 32 wherein the matrix material has the same composition as the coating material.

35. The method of claim 32 wherein at least one of the matrix material and the coating material has a melting point of at least about 82° C.

36. The method of claim 32 wherein the matrix material is initially a liquid in the fuel additive composition.

37. The method of claim 32 wherein the coating material is the polymeric material.

38. The method of claim 37 wherein the polymeric material is polyethylene vinyl acetate.

39. The method of claim 13 wherein the fuel additive composition further comprises a release enhancer component in an amount effective to increase the release rate of the additive component from the fuel additive composition relative to an identical composition without the release enhancer.

40. The method of claim 39 wherein the release enhancer component is selected from the group consisting of a wicking materials, surfactants and mixtures thereof.

41. The method of claim 13 wherein the fuel additive composition further comprises a reinforcement component in an amount effective to increase the structural strength of the fuel additive composition relative to an identical fuel additive composition without the reinforcement component.

42. The method of claim 41 where the reinforcement component is selected from the group consisting of cotton, polypropylene and fiberglass fibers.

43. The method of claim 13 wherein the matrix material remains substantially insoluble in the fuel after the contacting.

44. The method of claim 13 wherein the fuel is a hydrocarbon-containing liquid.

* * * * *